Patented Oct. 30, 1928.

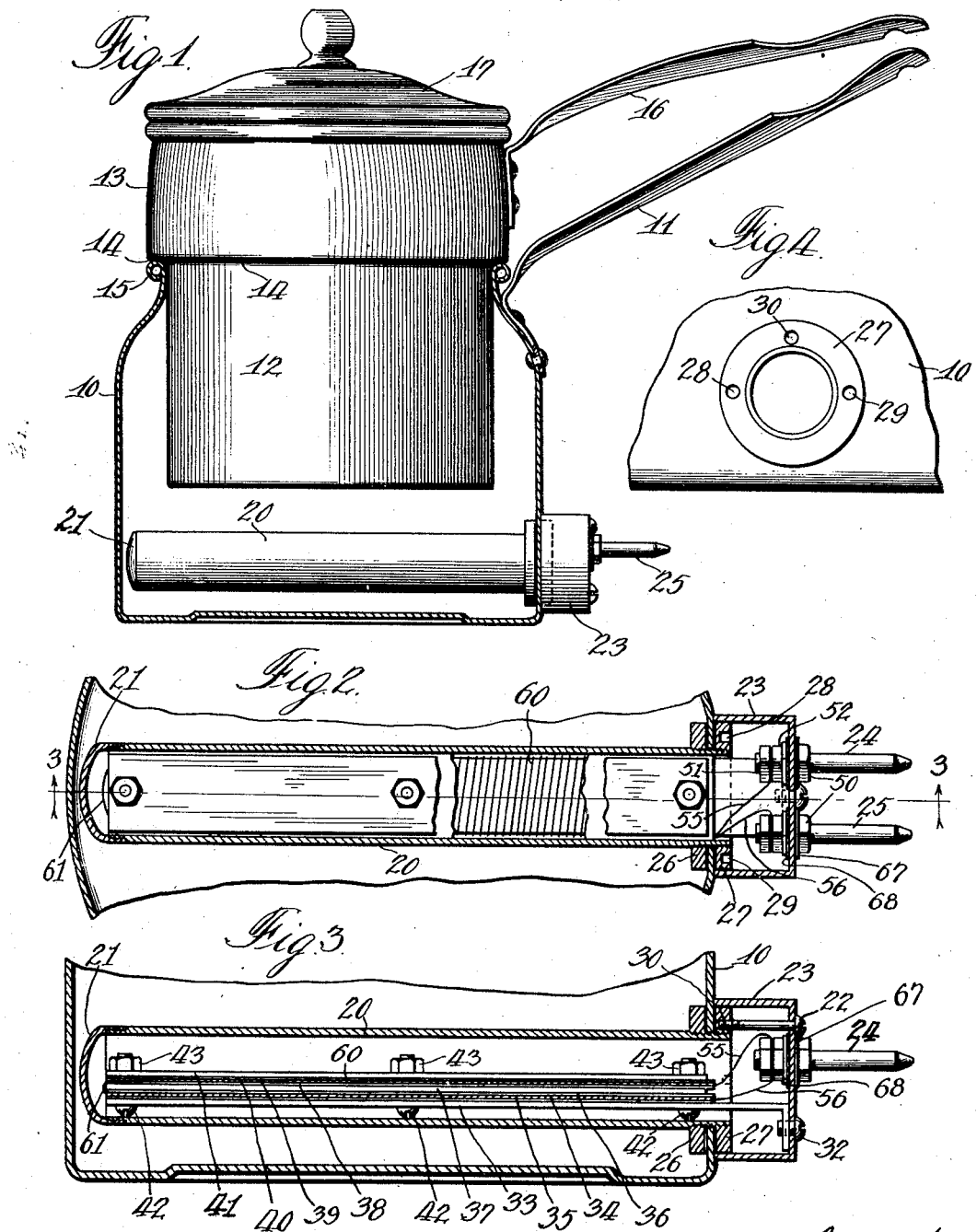

1,689,915

UNITED STATES PATENT OFFICE.

CHARLES ENDORF, OF CHICAGO, ILLINOIS.

ELECTRIC HEATING VESSEL.

Application filed December 16, 1925. Serial No. 75,681.

The invention relates to an electric heating vessel of the type commonly known as a double cooker and it is the primary object of the invention to provide an improved form of double cooker in which the outer or fluid containing vessel is provided with a heating element electrically operated for the purpose of supplying heat to be conducted to the usual inner vessel which is supported by and partially encased or sheathed by the outer vessel.

It is a further object of the invention to provide in an electric cooking vessel improved means for securing a heating unit within the outer vessel or container in such a manner that the heating unit within the outer vessel will be completely surrounded by water or other liquid usually contained in the outer or containing vessel of such cookers.

It is a further object of the invention to provide improved means for securing the heating element upon the interior of the outer or sheathing vessel of a double cooker.

It is a further object of the invention to provide improvements in a construction of a heating element adapted to be supported by the wall of the outer or sheathing vessel of a double cooker in order that the heating element may be suspended within the interior of the outer or sheathing vessel of the cooker and substantially surrounded by liquid when contained therein during the cooking operation.

It is a further object of the invention to provide improved means for securing an electrical heating element or unit on the interior of the outer or sheathing vessel of a double cooker.

It is a further object of the invention to provide certain new and useful improvements in the construction of the container for the heating element whereby the heating element is secured on the interior of the outer or sheathing vessel of a cooker, and whereby the same is protected from liquid contained within the outer or sheathing vessel during the cooking operation.

It is a further object of the invention to provide certain new and useful improvements in an electric heating element adapted to be used in connection with cooking vessels.
Other objects of the invention will appear from the following description of the preferred form of the invention, the novel features of which are depicted in the drawings, set forth in detail in the specification and finally pointed out more particularly in the appended claims.

In the said drawings, Fig. 1 is an elevation view of the device with the outer or sheathing vessel of the cooker in section.

Fig. 2 is a longitudinal section view through the heating unit showing also adjacent broken portions of the outer or sheathing vessel of the cooker.

Fig. 3 is a similar view being a vertical section taken on line 3—3 of Fig. 2, looking in the direction of the arrows.

Fig. 4 is a fragmentary view illustrating the details of construction of a portion of the sheath of the heating element exposed on the exterior of the outer vessel.

The reference character 10 designates the outer vessel of a cooker of conventional form provided with the usual handle 11 and being adapted to receive the food retaining vessel 12 provided with an enlarged portion 13, providing an offset or ledge 14 adapted when assembled to contact with the bead 15 around the upper periphery of the outer or sheathing vessel 10. The cooking vessel or compartment 13 will also be provided with the usual handle 16 and is closed by a cover 17.

In double cooking vessels of this type the food to be cooked is placed in the vessel 12 which is partly immersed in water contained in the outer or sheathing vessel 10 and in order to apply my improved heating device I perforate the wall of the vessel 10 in order that it may receive and support the heating element on the interior of this vessel. The location of this perforation may be observed from the illustration in each of Figs. 1 to 4 inclusive and is preferably located in the wall of the vessel near the bottom portion so that the heating element will be suspended on the interior of the vessel and extend diametrically thereof a very short distance, as illustrated in Fig. 1, above the bottom of the vessel. For convenience in handling the device it is preferred that the perforation for the heating element be immediately below the handle 11. The reference character 20 designates a metallic sheath or container of the heating element and is designed to protect the heating element from direct contact with liquid on the interior of the vessel. It is preferably made from a drawn or otherwise suitably formed metallic tube which is preferably circular in cross section and is threaded at its extremities as indicated in Figs. 2 and 3, and is of a length so that it will, when in position in the vessel, extend diametrically from the wall on the side to which it is secured to a point adjacent or even contiguous with the wall on the opposite side in order to afford the maximum amount of heating surface to be presented to the liquid on the interior of the vessel. The heating tube 20 is closed at its inner end in any suitable manner to render it liquid-tight, as for example, by the cap 21 which may be screw threaded as indicated in Figs. 2 and 3 to co-operate with the threaded end of the tube 20. It is one of the desirable features of my invention that I construct the heating element proper so that it is detachable from the vessel and the sheathing tube 20 by the removal of a single screw, which latter is designated by the reference character 22 and is inserted through a perforation as shown in Fig. 3 in the heating element cap 23, which latter carries the usual terminal or binding posts 24 and 25 in the circuit for energizing the heating element.

An important feature of my invention is to secure a perfect liquid tight joint to prevent any possible leakage of liquid from the interior of the vessel 10 through the joint by which the heating element and its sheathing tube 20 is secured to the vessel. To accomplish this the open end of the tube 20 is screw threaded as indicated in Figs. 2 and 3 to an extent which will permit of the use of two locking washers of substantial thickness, as designated by reference characters 26 and 27 respectively. These washers are both circular in form and have screw threaded openings to co-operate with the elongated threaded end of the tube 20. The threaded circular nut or washer 26 will be assembled on the tube 20 to a fixed position, preferably at the inner end of the threaded portion to provide a shoulder or ledge for clamping the tube 20 in position in the perforated wall of the vessel 10. The threaded washer or nut 27, of a construction similar to 26, is provided with diametrically opposed openings designated by reference characters 28 and 29, which are adapted to receive a tool for setting this member in clamping relation with the threaded nut or washer 26 when the parts are assembled in the perforation in the wall of the vessel 10 in the manner illustrated in Figs. 2 and 3. The threaded locking washer or nut 27 is also provided with a screw threaded opening 30 adapted to take the aforesaid screw 22 for locking the heating element cap and the heating element attached thereto in its operative position in the sheathing tube 20. When the tube 20 is to be placed in position as illustrated most clearly in Figs. 2 and 3 with the locking washer or nut 26 screwed down to the position illustrated in Figs. 2 and 3, the tubular member 20 may be inserted in its normal position in the opening in the wall of the vessel 10, after which the circular locking ring or nut 27 will be applied and screwed down very firmly so that the locking washers or rings 26, 27 will grip the wall of the vessel 10 around the perforation with sufficient force to form a water-tight joint, which latter may be improved by the use of suitable packing as a coating of shellac between each of these locking washers or rings and the vessel walls or other suitable and well known materials used for such purposes.

The above described method of securing the sheathing tube 20 to the vessel wall and suspending the same on the interior thereof affords a non-leakable joint when taken in connection with my detachable and quickly removable heating element which makes it unnecessary for the user of the device to remove the tube 20 or its supporting and attaching parts at any time. The threaded cap 20 for this tube and the improved type of joint, as shown and described, also forms a perfect protection against leakage either into the tube sheath of the heating element or through the wall of the vessel 10 adjacent the opening. The cap 23 has the peripheral flanged wall as illustrated in Figs. 2 and 3 for telescoping over the outer periphery of the circular locking washer or nut 27 so that when the screw 22 is inserted this cap will be held rigidly in position to support the terminal plugs or binding posts 24, 25, and this cap is also designed to serve as a support for the heating element proper, and it is therefore formed of metal of suitable thickness so that it may be perforated to take the screw 32 which is adapted to engage a threaded opening in the angularly extending end of a metallic plate 33 forming the chief support for the heating element proper. The latter is made up by laying upon the top of the plate 33 a layer of mica 34. Upon this layer of mica 34 is a mica core consisting of a sheet of approximately the width of the metallic supporting plate 33 and the aforesaid mica strip 34, which is designated by the reference character 35, and which receives the winding of the heating circuit wires. Upon this wound mica core is laid another flat strip of mica designated by reference character 36. On top of the mica strip 36 is a metallic strip 37, of approximately the width of the supporting plate 33 and upon the metal strip 37 is laid another mica strip 38, then the second mica core or strip 39, on top of which is placed another plain mica strip 40 and a final retaining metal plate 41. All of the metallic plates aforesaid including the supporting plate 33 together with the wound and unwound mica strips will be perforated to receive the locking screws 42, which latter are provided with locking nuts 43 for binding these laminæ of the heating element together. The length of the screws 42 and width of the metallic and mica layers will be such that when the parts are assembled the heating element thus formed may be inserted within the sheath or tube 20, and I find it is an advantage to make the width of the unwound mica plates approximately the diameter of the interior opening of the tube 20, thus affording a slightly frictional sliding fit so that the heating element will position itself easily when inserted in the tube 20, and the outer supporting cap 23 will slide to its proper position, telescoping over the periphery of the locking nut or washer 27. The binding or terminal posts 24, 25 may be of any usual or desired construction. In the form shown they have the usual enlargements or polygonal portions as indicated at 50, and their inner ends are screw threaded to take the usual locking nuts 51, 52 between which the positive and negative terminals of the circuit heater wire may be clamped. These terminal portions of this wire are designated in Figs. 2 and 3 by reference characters 55 and 56 and the portion of the wire which is wound upon the mica cores 34 and 39 is designated generally by the reference character 60. The wire 60 will be coiled around these mica core plates in the usual manner and the wire 60 in order that the cores may be in series will extend over the end of the metallic plate 37, as indicated at 61 in Figs. 2 and 3.

The construction of my heating element and particularly the sheathing tube and means for attaching same to the vessel 10 affords an efficient means of attaching the heating element to the vessel and the same is also economical to manufacture, while at the same time its accessibility and quality of being easily removed makes replacements of the heating element a comparatively easy and simble operation even for users of cooking devices who are not skilled in handling electrical devices.

It will be apparent that persons skilled in the art may resort to various modifications without departing from the purpose and spirit of my invention, the scope of which is defined by the following claims.

What I claim as my invention and desire to secure by Letters Patent is:

1. In an electric heating vessel, the combination with a container, of a tubular member adapted to extend diametrically of the container on the interior thereof, means for detachably clamping the tubular member to the wall of the container with an open end of the said tubular member accessible from the exterior of the container, said means comprising a washer or nut in screw threaded engagement with the tubular member, an electric heating element slidably and detachably carried within the tubular member, means for attaching the electric heating element comprising a cap secured to one end of the electric heating element, a screw adapted to pass through an opening in the cap and having screw threaded engagement with the said washer or nut, and a plurality of terminal or binding posts carried by the cap.

2. In an electric heating vessel, the combination with a container having an aperture formed in the wall thereof, of a tubular member positioned in said aperture and having a closed end and an open end adapted to be positioned on the interior and exterior respectively of said container, and having threads formed adjacent its open end, means for detachably securing said member adjacent its open end to said wall, said means comprising a pair of screw threaded washers or nuts positioned on the threaded portion of said tubular member at opposite sides of said wall adjacent said aperture, and co-operable with said threads and with each other in a manner to clamp said wall securely between said nuts, an electric heating element in said tubular member, a cap secured to the outer end of said element, a plurality of electric terminal connections mounted on said cap and connected to said element, and means co-operable with said cap and one of said nuts for removably securing said cap against the outer face of said wall in a manner to cover said last mentioned nut and the open end of said tubular member.

In testimony whereof I have signed my name to this specification, on this first day of October, A. D. 1925.

CHARLES ENDORF.